United States Patent
Bedekar (10) Patent No.: US 12,232,202 B2
(45) Date of Patent: Feb. 18, 2025

(54) EFFICIENT CONTEXT HANDLING FOR RRC-INACTIVE IN 5G

(71) Applicant: Nokia Solutions and Networks Oy, Espoo (FI)

(72) Inventor: Anand Bedekar, Glenview, IL (US)

(73) Assignee: Nokia Solutions and Networks, Espoo (FI)

( * ) Notice: Subject to any disclaimer, the term of this patent is extended or adjusted under 35 U.S.C. 154(b) by 425 days.

(21) Appl. No.: 17/623,942

(22) PCT Filed: Jul. 3, 2019

(86) PCT No.: PCT/IB2019/055699
§ 371 (c)(1),
(2) Date: Dec. 30, 2021

(87) PCT Pub. No.: WO2021/001680
PCT Pub. Date: Jan. 7, 2021

(65) Prior Publication Data
US 2022/0369410 A1    Nov. 17, 2022

(51) Int. Cl.
*H04W 76/27*    (2018.01)

(52) U.S. Cl.
CPC .................. *H04W 76/27* (2018.02)

(58) Field of Classification Search
CPC .................................................. H04W 76/27
See application file for complete search history.

(56) References Cited

U.S. PATENT DOCUMENTS

| 2004/0009779 | A1* | 1/2004 | Qu ................. H04W 4/14 455/445 |
| 2013/0260740 | A1* | 10/2013 | Rayavarapu ....... H04W 76/27 455/422.1 |
| 2018/0332467 | A1* | 11/2018 | Tenny ............... H04W 76/11 |
| 2018/0368196 | A1* | 12/2018 | Gage ................ H04L 63/0428 |

FOREIGN PATENT DOCUMENTS

| CN | 101141810 B | * | 5/2011 |
| CN | 109699050 A | | 4/2019 |
| CN | 109804705 A | | 5/2019 |
| EP | 2 645 806 A1 | | 10/2013 |
| EP | 2645804 A1 | | 10/2013 |
| GB | 2557868 A | | 7/2018 |
| WO | WO 2018/064519 A1 | | 4/2018 |
| WO | WO-2018/172943 A1 | | 9/2018 |
| WO | WO-2019/093850 A1 | | 5/2019 |
| WO | WO-2019/097470 A1 | | 5/2019 |

* cited by examiner

*Primary Examiner* — Thu V Nguyen
*Assistant Examiner* — Ranjan Pant
(74) *Attorney, Agent, or Firm* — McCarter & English LLP (57) ABSTRACT

An apparatus, method and computer program product of a new functional entity, namely an RRC-Inactive Context Hosting (RICH) entity, receiving, from a radio access node, a Push UE context notification or a Fetch UE Context Request. In response to the receiving of the Push UE context notification, the RICH entity sends the radio access node an ACK or NACK, while in response to the receiving of the Fetch UE Context Request, the RICH entity retrieves information requested. In response to the sending of the ACK, the RICH entity stores information contained in the notification, while in response to the retrieving, the RICH entity sends the radio access node the retrieved information.

20 Claims, 7 Drawing Sheets

EFFICIENT CONTEXT HANDLING FOR RRC-INACTIVE IN 5G

CROSS REFERENCE TO RELATED APPLICATION

This patent application is a U.S. National Stage application of International Patent Application Number PCT/IB2019/055699 filed Jul. 3, 2019, which is hereby incorporated by reference in its entirety.

This invention relates generally to the RRC state in 5G of RRC Inactive and, in particular, a transition between the RRC connected and the RRC Inactive state with RRC Suspend/Resume procedures allowing for a quick resumption of the RRC Connection without involving the core network where individual gNBs are memory-constrained but enabled to handle contexts for a large number of UEs in the RRC Inactive state.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

In 5G a new RRC state called 'RRC Inactive' has been introduced. A UE can transition between RRC connected and RRC Inactive state with RRC Suspend/Resume procedures. Both the UE and the gNB are expected to store the UE's Access Stratum (AS) Context in the RRC Inactive state, to allow quick resumption of the RRC Connection (i.e. a quick return to the RRC connected state, also known as active state, wherein the data transmission to or from the UE can be conducted) without involving the core network. This provides a low latency of transition to RRC connected state, and lower user-perceived delay, thus facilitating lower-latency applications. Without the use of RRC Inactive state (in 5G or even in LTE), a UE would transition to RRC Idle state from RRC Connected, at which point the RAN (eNB) deletes the UE's context. When the UE wants to return to RRC Connected to conduct data transmission, core network involvement is needed to re-establish the UE context at the RAN. This results in a higher latency of transition to RRC connected state, with the result that there is a higher delay before data transmission to or from the UE can be conducted.

In 5G, to put UE into RRC Inactive, the serving gNB sends the UE a RRCConnectionSuspend message containing a ResumeIdentity (typically a I-RNTI e.g. a 40-bit string)

In RRC Inactive, a UE is allowed to move within a RAN-based Notification Area (RNA) which can span multiple gNBs. UE reports an RNAU (RAN Notification Area Update) when crossing RNA boundaries (or periodically).

The UE can be paged, for instance, when data arrives from core network. The last serving gNB can send a RAN Paging message over Xn to other gNBs in the RNA for the UE, which page the LIE over the air.

To start the process of exiting from RRC-Inactive and return to RRC Connected state (either in response to network-initiated paging, or UE-initiated), the UE performs RACH in the gNB of its current coverage and sends RRC-ConnectionResumeRequest message with the ResumeIdentity (typically an I-RNTI, for example, a 40-bit string). This transition from the RRC Inactive state to RRC Connected state is called the RRC Connection Resume process.

If the UE responds with a RAN Connection Request in a new/different gNB, that new/different gNB can Retrieve UE context from the last serving gNB over Xn, and continue to transition UE into RRC Connected. How the new NG-RAN node is able to resolve the old NG-RAN ID from the I-RNTI is a matter of proper configuration in the old and new NG-RAN node.

The current invention moves beyond these techniques.

Acronyms or abbreviations that may be found in the specification and/or the drawing figures are defined within the context of this disclosure or as follows below:
3GPP third generation partnership project
5G fifth generation
5GC 5G core network
AMF access and mobility management function
CU central unit
DU distributed unit
eNB (or eNodeB) evolved Node B (e.g., an LTE base station)
gNB (or gNodeB) base station for 5G/NR, i.e., a node providing NR user plane and control plane protocol terminations towards the UE, and connected via the NG interface to the 5GC
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
I/F interface
LTE long term evolution
MAC medium access control
MME mobility management entity
NCE network control element
ng or NG new generation
ng-eNB or NG-eNB new generation eNB
NR new radio
N/W or NW network
PDCP packet data convergence protocol
PHY physical layer
RAN radio access node
Rel release
RLC radio link control
RRH remote radio head
RRC radio resource control or radio resource controller
RU radio unit
Rx receiver
SDAP service data adaptation protocol
SGW serving gateway
SMF session management function
TS technical specification
Tx transmitter
UE user equipment (e.g., a wireless, typically mobile device)
UPF user plane function

BRIEF SUMMARY

This section is intended to include examples and is not intended to be limiting.

An example of an embodiment of the instant invention is apparatus comprising: at least one processor and at least one memory including computer program code, wherein the at least one memory and the computer code are configured, with the at least one processor, to cause the apparatus to at least perform the following: receiving, from a radio access node, a Push user equipment (UE) context notification or a Fetch UE Context Request; in response to the receiving of the Push UE context notification, sending the radio access node an acknowledgement (ACK) or a negative acknowledgement (NACK); in response to the receiving of the Fetch UE Context Request, retrieving information requested; and in response to the sending of the ACK, storing information contained in the notification; in response to the retrieving, sending the radio access node the retrieved information.

An example of an additional embodiment of the instant invention is a method comprising: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

An example of yet another embodiment of the current invention is a computer program product embodied on a non-transitory computer-readable medium in which a computer program is stored that, when being executed by a computer, is configured to provide instructions to control or carry out at least: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

An example of a still further embodiment of the present invention is an apparatus comprising means for: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

BRIEF DESCRIPTION OF THE DRAWINGS

In the attached Drawing Figures:

FIG. 3 consists of FIG. 3A, FIG. 3B, FIG. 3C, and FIG. 3D, each of which depicts an exemplary realization of the present invention;

DETAILED DESCRIPTION OF THE DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The problem addressed by embodiments of the present invention is that in order to support RRC-Inactive for most/all UEs, a gNB would have to store the UE contexts of all the UEs in RRC-Inactive, which can lead to high memory requirements, which are unsustainable for the conventional gNB architectures that are still the dominant mode of deployment worldwide.

The exemplary embodiments herein describe techniques for efficient context handling for RRC inactive in 5G. Before turning to how an exemplary embodiment would function, FIG. 1 is presented showing a block diagram of one possible and non-limiting exemplary system in which the exemplary embodiments may be practiced.

Figure 1:
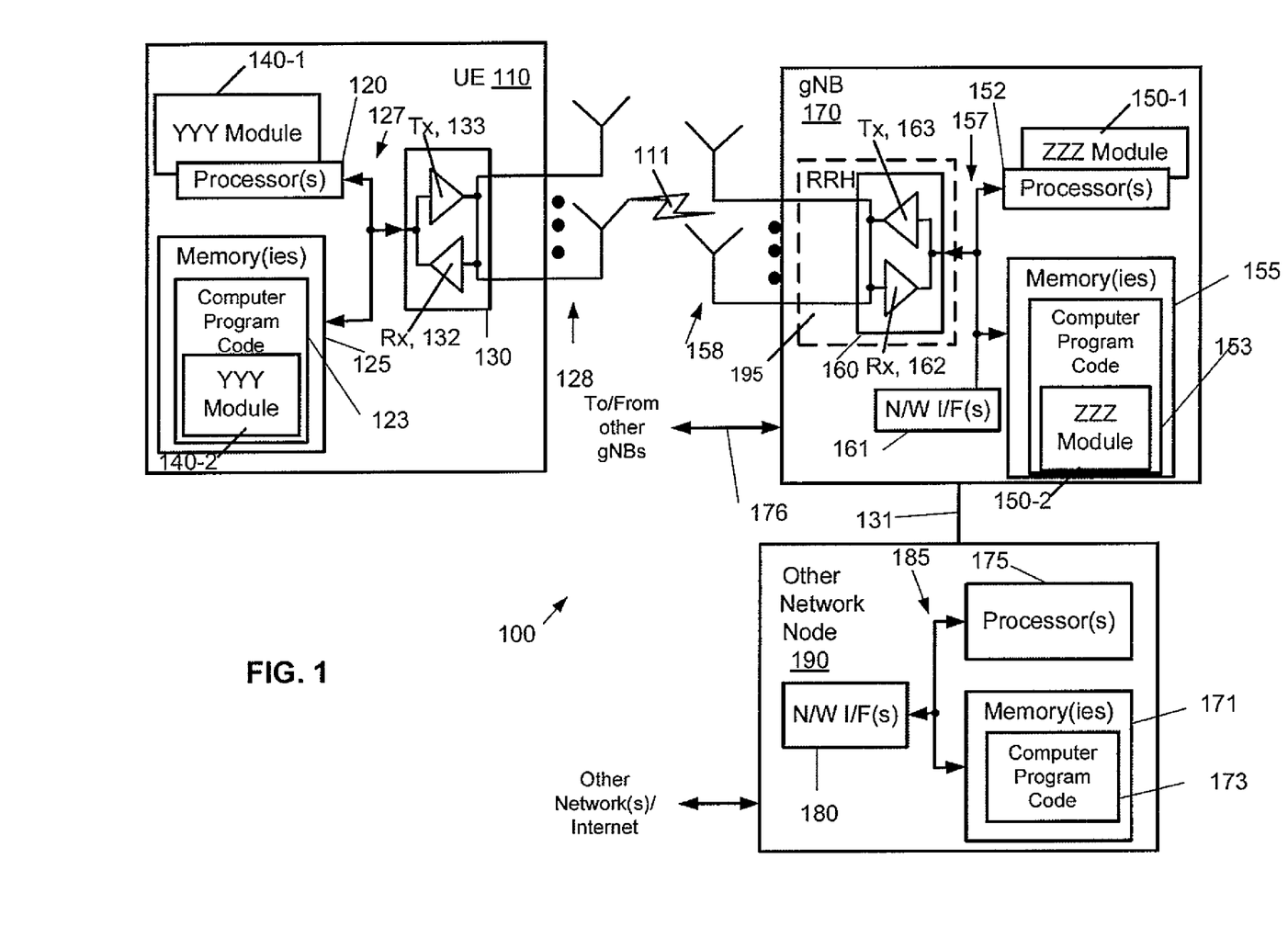
FIG. 1 is a block diagram of an exemplary system in which the exemplary embodiments may be practiced.

FIG. 1 shows a block diagram of one possible and non-limiting exemplary system in which the exemplary embodiments may be practiced. A user equipment (UE) 110, radio access network (RAN) node 170, and network control element(s) (NCE(s)) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the NCE(s) 190). The ng-eNB is a node providing E-UTRA user plane and control plane protocol terminations towards the UE, and connected via the NG interface to the 5GC. The NG-RAN node may include multiple gNBs, which may also include "logical" elements, namely a central unit (CU) (gNB-CU) 196 and distributed unit(s) (DUs) (gNB-DUs), of which DU 195 is shown. The CU is a logical node which may include the functions (i.e., gNB functions) such as transfer of user data, mobility control, radio access network sharing, positioning, session management, etc., except those functions allocated exclusively to the DU. The CU may control the operation of DUs over a front-haul (F1) interface. The CU may also be known as BB U/REC/RCC/C-RAN/V-RAN. The DU is a logical node which may include a subset of the functions (i.e., gNB functions), depending on the functional split option. The operation of the DU may be controlled by the CU. The CU may also contain intra-CU interfaces, e.g. E1 interface between its user and control plane functions. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the ZZZ module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X2 interface for LTE eNBs or for interaction between a 5G gNB and an LTE eNB, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. In this sense, term cell may be used interchangeably to refer to a geographic area of coverage or to the logical functions for the transmission/reception of signals (and related protocols) within the coverage area. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include another network node 190, such as a network control element (NCE) (or elements, NCE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF (S)) and/or user plane functions (UPF(s)) and/or session management function(s) (SMF(s)). Such core network functionality for LTE may include MME (Mobility Management Entity)/SGW (Serving Gateway) functionality. The other network node may also be or include a Controller such as a RAN Intelligent Controller (RIC). These are merely exemplary functions that may be supported by the NCE(s) 190, and note that both 5G and LTE functions might be supported. The RAN node 170 is coupled via a link 131 to the NCE 190. The link 131 may be implemented as, e.g., an NG interface for 5G, or an S1 interface for LTE, or an E2 or A1 interface in the case of a RAN intelligent controller, or other suitable interface for other standards. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

As noted above, in 5G a new RRC state called 'RRC Inactive' has been introduced, which allows low latency resumption of a connection without core network involvement, but which requires the RAN/gNB to store the context of the UE.

Typically a gNB may have a few hundred (e.g. ~300) RRC-connected UEs at a given time, but the total number of UEs physically within the cell may be multiple times of this, for instance, greater than 1000 in some cases. RAN typically releases RRC connected UEs into RRC-Idle state after a period of data inactivity, to avoid having to store the RRC context for a large number of UEs For 5G, a key requirement is to provide low "transition to active" latency. So the RAN (gNB) should put these UEs into RRC-Inactive rather than RRC-Idle, so as to enable the UEs to have a low-latency connection resumption when it is desired to return to connected state. However, since the access stratum state or context of the UE is required to be stored in the network during RRC Inactive state so as to enable the RRC Connection Resume, this would require the RAN (gNB) to store a lot more UE contexts than the number of RRC connected Ues (e.g. gNB would need to store 1000s of contexts rather than 100s).

A gNB typically has tight memory constraints. For example, a system card in a gNB may have only a few gigabytes of memory, which has to accommodate all the stored UE contexts for multiple cells (multiple sectors, multiple carriers). Such a memory constraint significantly hampers the ability to store much higher number of UE contexts that are needed to enable RRC-inactive for these UEs. While in principle 5G allows for cloud gNBs which may have fewer memory constraints, a lot of network operators do not have cloud deployments, such that most of the 5G deployments are likely to use 'conventional' (non-cloud) gNB architectures, where such gNBs typically have tight memory constraints A problem that embodiments of the present solve is devising a way to enable handling contexts for a large number of UEs in RRC-Inactive state for a 5G RAN network in which individual gNBs may be memory-constrained.

Exemplary embodiments of an apparatus would comprise a new functional entity "RRC-Inactive Context Hosting" (RICH) and gNBs would be enhanced to interact with RICH, per a method comprising a first aspect and second aspect.

The first aspect, Aspect A, comprises a first gNB (gNB1) sending a "Push UE context" notification to the RICH entity, providing one or more UE contexts of UEs in RRC Inactive, along an identifier for each UE such as a resume identity (e.g. I-RNTI). RICH stores the UE context, indexed by the provided identities like I-RNTI.

The second aspect, Aspect B, comprises that when it is desired to transition a UE from RRC inactive state to RRC Connected state by a second gNB, such as when a UE sends RRC Connection Resume Request at a second gNB (where gNB2 is possibly different from gNB1), then the UE context is fetched from RICH. For instance, in a first option, that would be better for UE-initiated connection resume, gNB2 sends Fetch UE Context Request to RICH (along with I-RNTI provided by UE in its RRC Connection Resume Request). Thereafter, the RICH retrieves UE context and sends to gNB2. In a second option 2, that is better for network-initiated resume, such as with paging, gNB1 typically gets DL data from core network that is destined for a UE that is in RRC inactive state. Then, gNB1 sends Fetch UE Context Request to RICH and provides a suitable identifier of the UE (i.e., a suitable UE ID). Thereafter, the RICH retrieves the UE context based on UE ID and provides it to gNB1, such as using Fetch UE Context Response, which can be done in parallel with RAN paging procedure. With either option, gNB2 can then continue normal RRC Connection Resume procedure Additional features of an exemplary method are also available.

In an additional feature, the RICH may be part of a RAN Intelligent Controller (RIC), or a standalone entity, for instance, a cloud-based service, or another gNB. Correspondingly, the interface to RICH may be over E2 (in case RICH is part of RIC), over Xn (in case RICH is part of another gNB), or via another interface methodology.

In another feature, if the RICH itself can no longer store further UE contexts, then the RICH can send a message to its gNB peers to "Disallow UE context push" (or stop UE context push), to indicate that the gNB should no longer send the RICH further Push UE context requests. This may be useful, for example, when the RICH is running out of storage space, so that it can no longer store further UE contexts, or for a variety of other conditions such as a failure of a disk or even congestion on network links. Conversely, to allow peer gNBs to push UE contexts, for example when the RICH has regained enough free storage, then the RICH can send "Allow UE context push" message. These mechanisms are especially useful in a case where RICH is part of another gNB, which itself may be memory constrained.

As another feature, I-RNTI can be constructed by gNB1 to embed the ID of the RICH (either in addition to gNB1 ID, or instead of it). This I-RNTI can be provided to the UE when it enters RRC Inactive. When the UE desires to return to RRC-Connected, it can convey this I-RNTI to the gNB2 where it is attempting to transition back from RRC Inactive to RRC Connected. By inferring the identity of the RICH from the I-RNTI, gNB2 may optionally directly contact the RICH (in parallel to, or instead of, contacting gNB1).

In a further feature, there can be more than one RICH to which a given gNB can push contexts. For example, more than one cloud-based instances, or more than one RICs hosting RICHs, and even, in principle, every gNB can contain a RICH.

Figure 2:
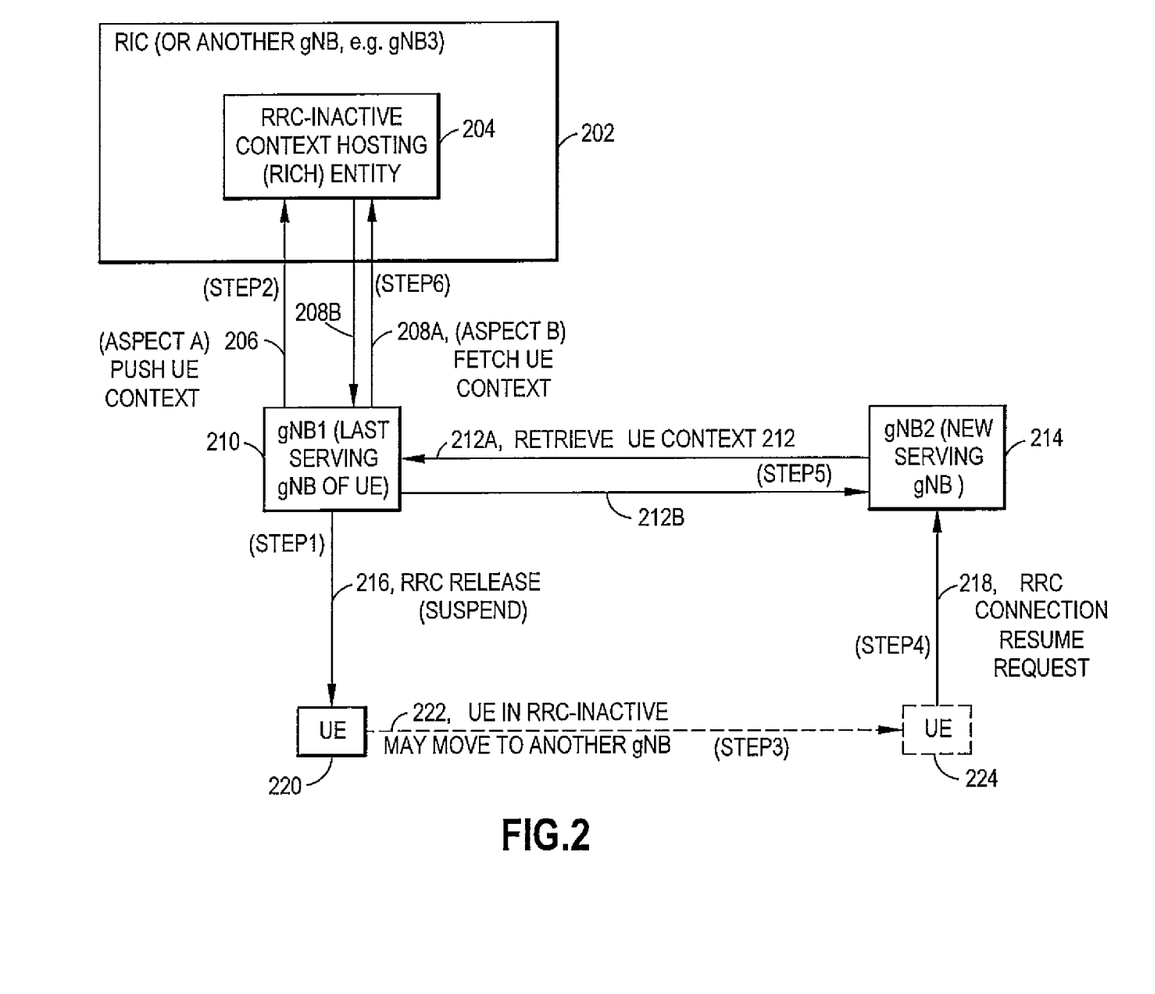
FIG. 2 is a block diagram of exemplary devices employing an exemplary method.

Turning to FIG. 2, which is a block diagram of exemplary devices employing an exemplary method, gNB1 210 (last serving gNB of UE), engages in step 1 which is a RRC Release (Suspend) 216. If Aspect A 206 as described above, is performed, then in a step 2, gNB1 pushes the UE Context to an RRC-Inactive Context Hosting (RICH) entity 204, such as an RIC (or another gNB, for example a gNB3) 202. The RICH stores the UE context, and may provide an acknowledgment of this to gNB1 210. The gNB1 may then delete the UE context from its own storage or memory or context database, but may store a small amount of data regarding the identity of the RICH to facilitate fetching the context at a later time. Further, the RRC Release (Suspend) of item 216 may include providing the UE a resume identity such as an I-RNTI that may embed the identity of the gNB1 and/or the identity of the RICH. In step 3, item 222, a UE 220 under control of gNB1, in RRC-Inactive, may move to the coverage area of another gNB, designated here as gNB2, item 214. In step 4, the UE 224 sends an RRC Connection Resume Request 218 to gNB2 (new serving gNB) 214. The UE may include the resume identity in this RRC Connection Resume Request. The gNB2 may infer the identity of the gNB1 (the UE's last serving gNB) from the resume identity. In step 5, item 212A, gNB2 (the new serving gNB) 214 contacts gNB1 (the last serving gNB of UE) to retrieve the UE context 212. and may include the UE's resume identity along with this. At item 208A, gNB1 then sends a Fetch UE context request to the RICH. The RICH then retrieves the UE context which it has stored and provides it back to gNB1 as shown in item 208B. gNB1 then provides the UE context to the gNB2 that is attempting to retrieve it, item 212B.

Figure 3A:
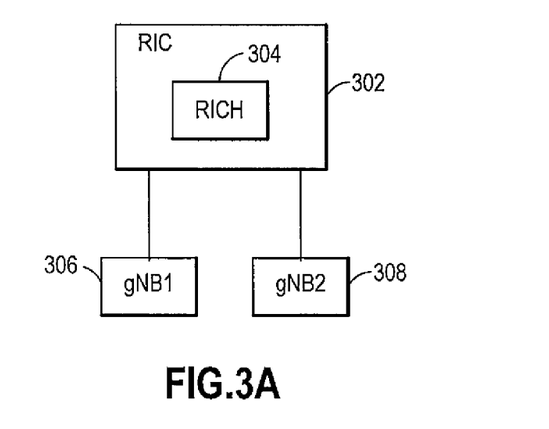
Figure 3B:
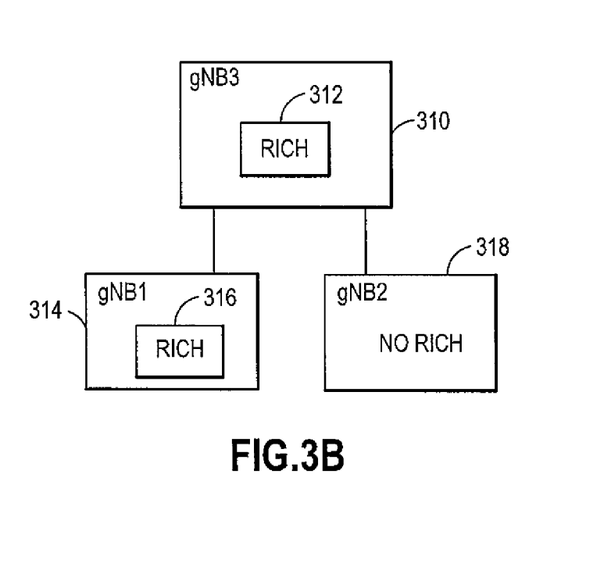
Figure 3C:
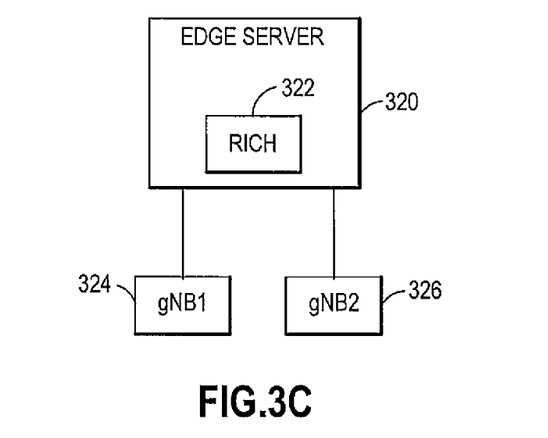
Figure 3D:
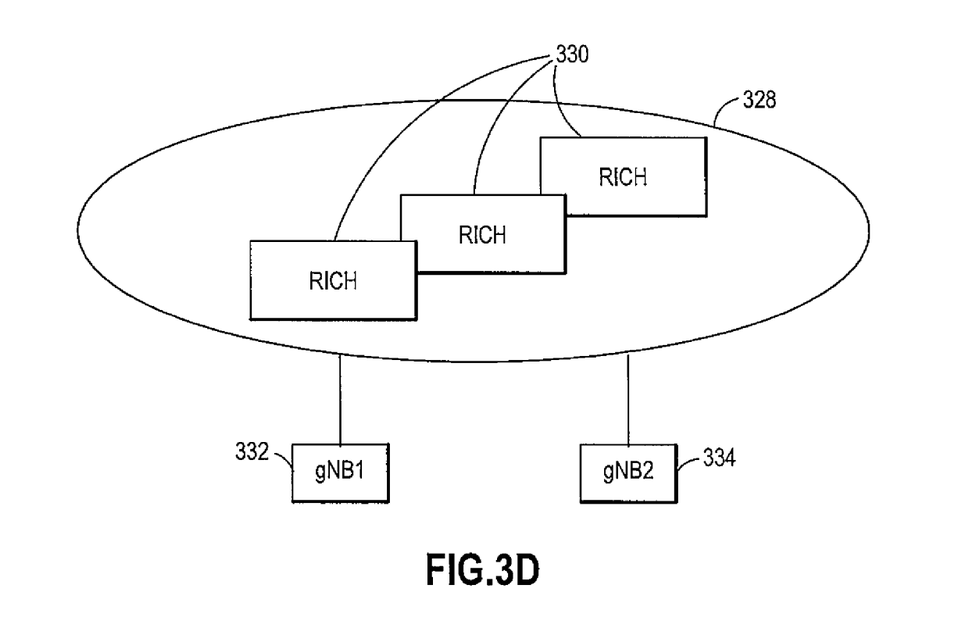

FIG. 3 consists of FIG. 3A, FIG. 3B, FIG. 3C, and FIG. 3D, each of which depicts an exemplary realization of the present invention. FIG. 3A shows RICH 304 as part of a RAN RIC 210 communicating with gNB1 306 and gNB2 308. FIG. 3B shows a distributed RAN, where one or more gNBs contain a RICH for instance gNB3 310 with RICH 302 communicating with both gNB1 314 shown with a RICH 316 and gNB2 318 without a RICH. FIG. 3C depicts a cloud server, such as a Nokia Edge Server 320, physically placed collocated to gNB with a RICH 322, communicating with both gNB1 324 and gNB2 326. FIG. 3D has Cloud Service 328 with pool of RICH instances 330, communicating with both gNB1 332 and gNB2 334.

Figure 4:
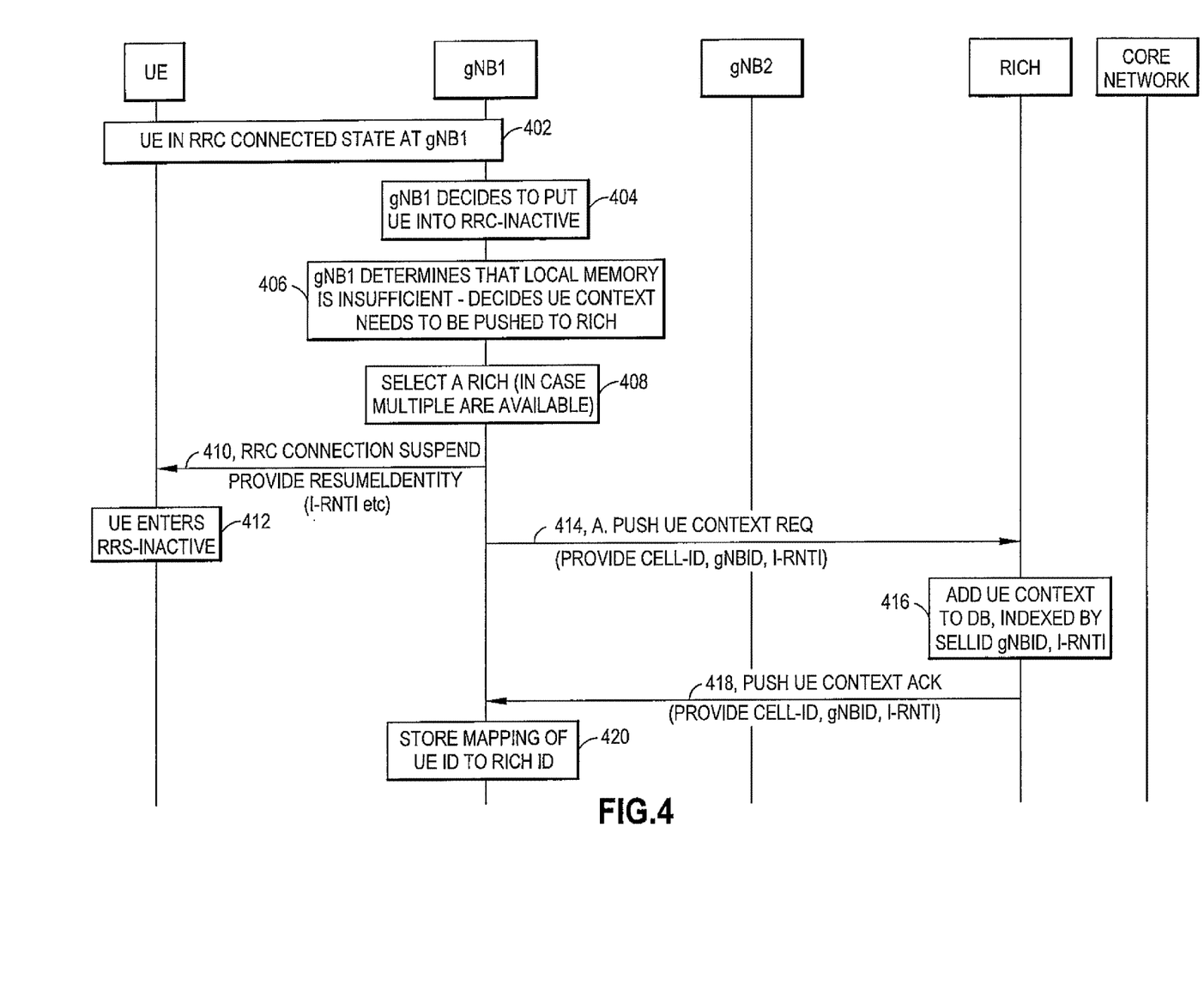
FIG. 4 shows an exemplary message flow diagram per an exemplary embodiment of the invention when a UE enters RRC Inactive.
Figure 5:
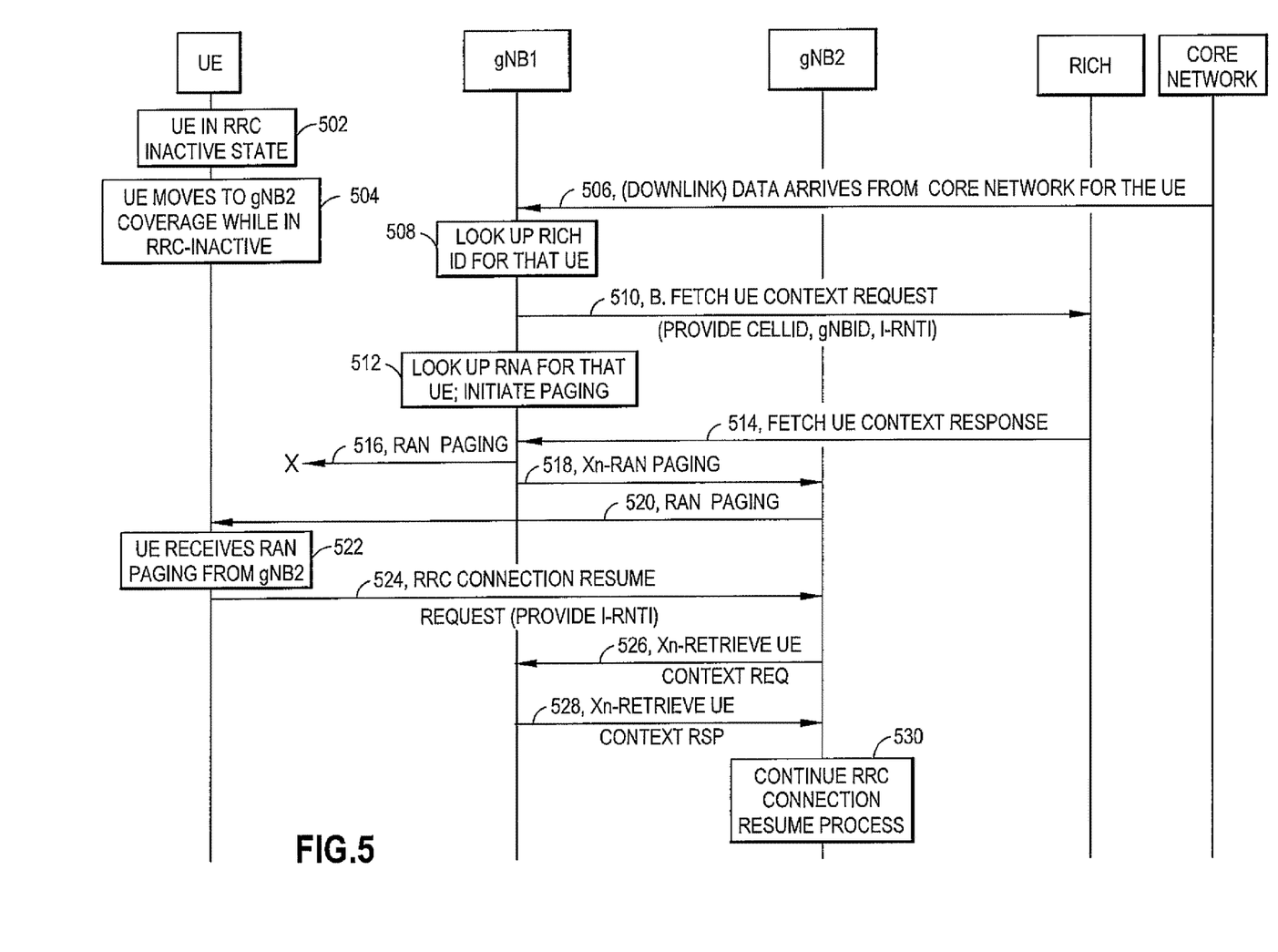
FIG. 5 shows an exemplary message flow diagram for an exemplary embodiment of the invention with a Network-initiated Resuming RRC Connection.

FIG. 4 and FIG. 5 are exemplary messaging diagrams. FIG. 4 depicts an exemplary message flow diagram per an exemplary embodiment of the invention when a UE enters RRC Inactive.

As FIG. 4 shows, in item 402, a UE is in RRC Connected state at gNB1, which decides 404 to put UE into RRC-inactive.

Thereafter, in item 406, gNB1 determines whether to push UE context to RICH, such as in the situation where gNB1's local memory is insufficient, by comparing the size of UE Context against the remaining available memory/buffer space within the allowed maximum total size of the UE contexts at gNB1. If exceeded (or about to exceed) maximum allowed total size, then gNB1 decides to push context to RICH.

In case multiple RICHs are available 408, gNB1 selects a RICH. Specifically, gNB1 maintains a list of allowed RICHs (either configured, or by notification at the time of connection setup with RICH—see later), gNB1 checks whether any RICHs have sent "Stop push of UE context indication" in which case such RICHs are ignored, and from among the remaining RICHs, gNB1 chooses one RICH according to a load-balancing policy, for example, by selecting a RICH by round-robin. Optionally, gNB1 may compute a hash of the UE ID (e.g. RAN NGAP ID, or TEID on N3) and pick the RICH based on that basis, which allows gNB1 to not have to store the identity of the RICH where the UE context is pushed as the RICH ID can be calculated subsequently from the UE ID when needed.

A message 410 is sent from gNB1 to the UE with RRC Connection Suspend providing a ResumeIdentity (such as I-RNTI for example). In particular, gNB1 may determine ResumeIdentity for UE in a way that embeds the RICH ID within the ResumeIdentity (for subsequent identification). 3GPP Standards provide for the use of a 40-bit string as I-RNTI, with the specifics of the construction of the I-RNTI being left up to the gNB. For example, gNB1 may use the first 4 bits of the I-RNTI to indicate the RICH ID. In addition, gNB1 may also embed its own gNB ID such as within the next 12 bits, where the rest of the bits may be used for UE ID.

The UE enters RRC-Inactive 412.

The next message 414 is where gNB1 pushes UE context to the RICH. After RICH is picked, gNB1 sends push UE context notification to RICH, along with UE context, gNB1 ID, cell ID, and UE ID (e.g. ResumeIdentity—IRNTI). RICH will store 416 the UE context, and may suitably index the context to facilitate quick retrieval subsequently, such as indexable by the UE's ID (e.g. I-RNTI) and cellID/gNB ID.

The next message 418 is from the RICH to gNB1 of acknowledgement of the Push UE Context. The RICH sends this to the gNB1 to indicate confirmation that it was able to store the UE context successfully. After RICH sends this acknowledgment or confirmation, gNB1 can delete the UE context from its local memory, but may save a mapping of the UE IDs to the RICH ID where the context was pushed as described below. In some embodiments, if the RICH is unable to store the UE context, it may instead send a negative acknowledgement or indication of failure to the gNB1.

To facilitate retrieval of context later, per item 420, gNB1 maintains a mapping of UE IDs (for UEs in RRC-Inactive state) to the RICH ID where the UE context has been pushed. The information that the gNB1 has to store about UE while in RRC-Inactive is limited to this, rather than storing the whole UE context. Multiple types of UE ID(s) may be stored for a given UE may be stored, for instance, RAN UE NGAP ID, TEID for user plane, I-RNTI, C-RNTI, etc. Once context has been pushed to the RICH for a given UE, the mapping is updated to reflect that. The mapping can be indexable by any of the types of UE ID to facilitate quick access. To facilitate quick RAN paging, the gNB1 can also store the RNA (RAN-based Notification Area ID) for the user (or a list of cells in the RNA), and paging timing/DRX information. In some embodiments, the RRC Connection Suspend 410 may be sent by gNB1 to the UE after the Push UE Context Ack 418 indicating confirmation from the RICH is received by gNB1.

FIG. 5 depicts an exemplary message flow diagram for an exemplary embodiment of the invention with a Network-initiated Resuming RRC Connection. In item 502, a UE is shown in RRC Inactive state. During RRC-Inactive state, a UE may move from coverage of gNB1 to gNB2 per item 504. From the core network perspective, the user plane tunnel still points to gNB1, so any incoming DL data for that UE will still be sent to gNB1 per item 506. So, in an exemplary embodiment, the UE then moves to gNB2 coverage while in RRC-Inactive since a connection may be resumed at a different gNB (such as gNB2) than when UE entered RRC-Inactive (gNB1). Connection resume may happen when either DL data arrives from core network (which is the case shown in FIG. 5, where RAN paging is executed—also known as network-initiated resuming of RRC Connection), or when UE has UL data to send (not shown but similar). So the first message shown is (downlink) data arriving from core network for the UE.

When DL data for a given UE arrives from core network at gNB1, per item 512, gNB1 has to look up ID of the RICH for that UE and, per item 514, initiates fetching the UE context from RICH. Specifically, when DL data arrives from the core network at gNB1, gNB1 looks up the stored UE mapping based on the TEID (if data is user plane data) or RAN NGAP UE ID (if core network has sent a control plane NAS message) to locate the stored mapping for that UE.

In message 516, gNB1 initiates RAN paging within the RNAU for that UE. In some cases, the RNAU for the UE may be part of the UE context which has previously been pushed to a RICH, and will need to be first fetched from the RICH in order to determine the RNAU of the UE for RAN paging. In the embodiment shown, to facilitate quick RAN paging, the gNB1 can also store the RNA (RAN-based Notification Area ID) for the user (or a list of cells in the RNA), and paging timing/DRX information. Due to this it can initiate RAN paging without having to wait for fetching the UE context first from the RICH. Specifically, based on the stored RNA gNB1 will initiate RAN paging for the UE using the RNA information stored for that UE. For instance, gNB1 pages in its own cell(s), and may also send Xn messages 518 for RAN Paging to other gNBs within the RAN Network Area, according to a paging policy. Another gNB, such as gNB2 will send message 520 for RAN paging, such that per item 522, the UE receives RAN paging from gNB2. In other words, when some other gNB, such as gNB2, receives RRC Connection Resume from the UE, per item 524, it then contacts gNB1 over Xn to retrieve the UE context per item 526.

Based on the stored RICH ID, gNB1 will contact the RICH sending Fetch UE Context Request. This can be done in parallel with RAN paging within the RNA to minimize UE-perceived latency. RICH gets the UE context from its store and sends it to the gNB1 with Fetch UE Context Response. RICH can delete its stored UE context after this.

The UE may respond to the page at a different gNB (gNB2), providing its I-RNTI in the RRC Connection Resume Request. Then gNB2 can contact the gNB1 with Retrieve UE Context per item 528. Optionally gNB2 may directly contact the RICH to Retrieve the UE context.

Then gNB1 and/or RICH can provide the UE context to gNB2 (gNB1 provides the context it fetched from the RICH), and the normal process for RRC Connection Resume can then be executed per item 530.

In an exemplary message flow for a UE-initiated Resuming RRC Connection, instead of DL data arriving from the core network, the UE may want to resume RRC Connection due to having UL data to send. In this case, the UE (which may have moved to coverage of gNB2 while in RRC-Inactive) conducts a RACH procedure followed by RRC Connection Resume Request to gNB2, providing its ResumeIdentity (I-RNTI). In this case, there are two options.

In a first option (Option 1), gNB2 infers the RICH ID from the I-RNTI (as gNB1 has constructed I-RNTI embedding the RICH ID within it). Then gNB2 sends Fetch UE Context Request directly to RICH ID. In this case gNB2 can directly execute Path Switch to core network to complete RRC Connection Resume In a second option (Option 2), gNB2 infers gNB1 ID from I-RNTI and sends Xn a Retrieve UE Context request to gNB1. Then gNB1 looks up RICH ID from I-RNTI and sends Fetch UE Context request to RICH. This requires potentially additional hop and latency.

Figure 6:
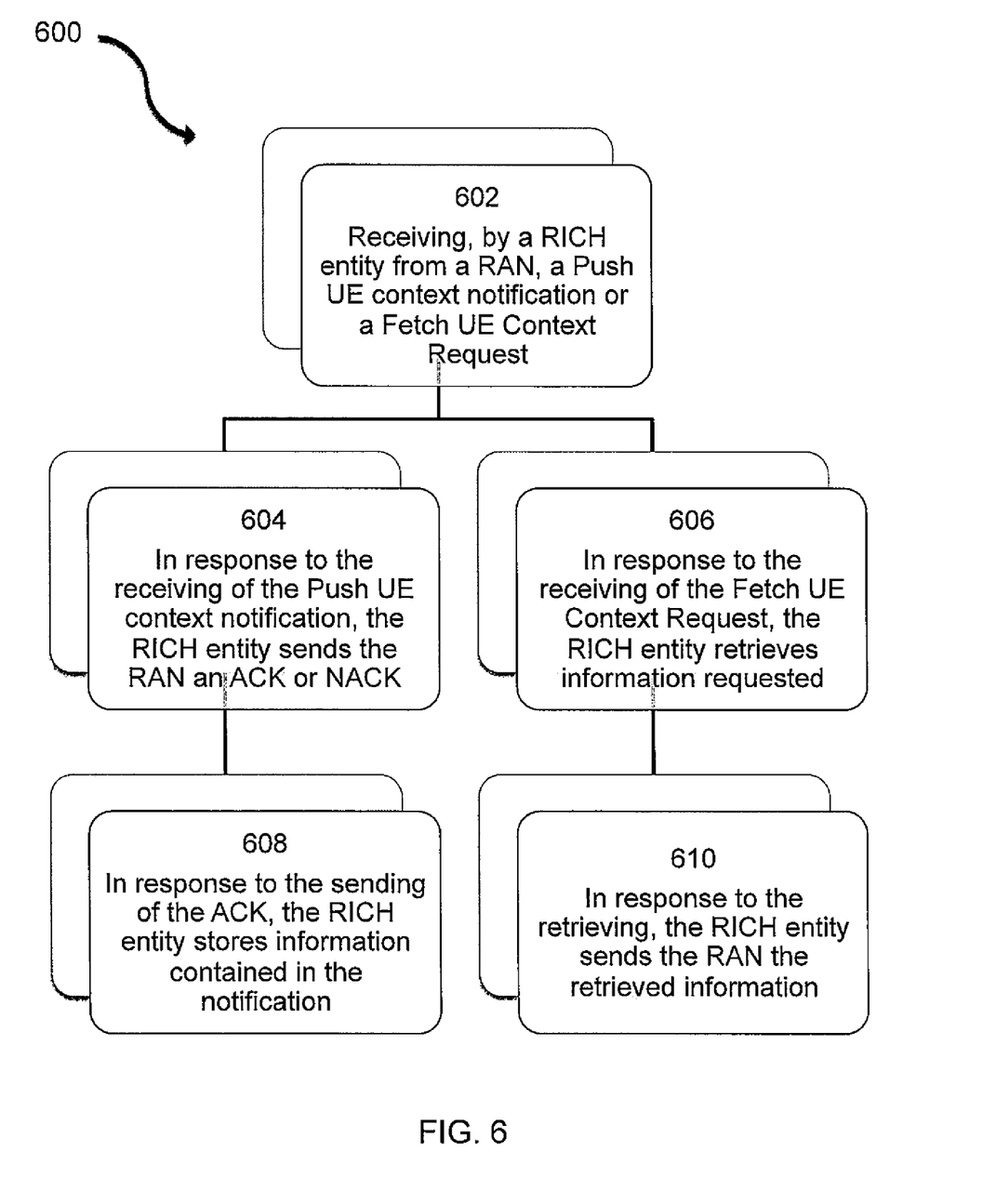
FIG. 6 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

FIG. 6 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

FIG. 6 shows an example of an embodiment of the instant invention, namely, a method 600 comprising the item 602 of receiving, by a RICH entity from a radio access node, a Push UE context notification or a Fetch UE Context Request. In item 604, in response to the receiving of the Push UE context notification, the RICH entity sends the radio access node an ACK or NACK. In item 606, in response to the receiving of the Fetch UE Context Request, the RICH entity retrieves information requested. In item 608, in response to the sending of the ACK, the RICH entity stores information contained in the notification. In item 610, in response to the retrieving, the RICH entity sends the radio access node the retrieved information.

Without in any way limiting the scope, interpretation, or application of the invention or of the claims appearing below, an advantage, benefit, or technical effect of one or more of the exemplary embodiments disclosed herein is enabling a gNB to not have to store all UE contexts of RRC Inactive UEs and can push these out to RICH (which could be at RIC, or another gNB, or in cloud).

Without in any way limiting the scope, interpretation, or application of the invention or of the claims appearing below, another advantage, benefit, or technical effect of one or more of the exemplary embodiments disclosed herein is the invention provides that the total number of RRC-inactive contexts that can be handled is limited only by "total memory" across gNBs and RICH(s), rather than limited by an individual gNB's memory.

Without in any way limiting the scope, interpretation, or application of the invention or of the claims appearing below, another advantage, benefit, or technical effect of one or more of the exemplary embodiments disclosed herein is the benefit of low latency of connection resume to large number (possibly even "all") UEs, rather than only to a limited number.

Without in any way limiting the scope, interpretation, or application of the invention or of the claims appearing below, another advantage, benefit, or technical effect of one or more of the exemplary embodiments disclosed herein is capitalizing on RIC and cloud where available and, also, with distributed gNBs for operators who do not have RIC or cloud.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

An example of an embodiment of the instant invention, which can be referred to as item 1, is apparatus comprising: at least one processor and at least one memory including computer program code, wherein the at least one memory and the computer code are configured, with the at least one processor, to cause the apparatus to at least perform the following: receiving, from a radio access node, a Push user equipment (UE) context notification or a Fetch UE Context Request; in response to the receiving of the Push UE context notification, sending the radio access node an acknowledgement (ACK) or a negative acknowledgement (NACK); in response to the receiving of the Fetch UE Context Request, retrieving information requested; and in response to the sending of the ACK, storing information contained in the notification; in response to the retrieving, sending the radio access node the retrieved information.

An example of a further embodiment of the instant invention, which can be referred to as item 2, is the apparatus of item 1, wherein the information of the Push UE context notification comprises contexts and corresponding identifiers of one or more UEs entering radio resource control (RRC) inactive state.

An example of a further embodiment of the instant invention, which can be referred to as item 3, is the apparatus of item 1, wherein information provided in the Fetch UE Context Request comprises an identifier of a UE in RRC inactive state.

An example of a further embodiment of the instant invention, which can be referred to as item 4, is the apparatus of item 3, wherein information requested by the Fetch UE Context Request comprises a UE context corresponding to the identifier.

An example of a further embodiment of the instant invention, which can be referred to as item 5, is the apparatus of item 1, wherein the Push UE context notification is received by the apparatus from a first radio access node and the Fetch UE context request is received by the apparatus from a second radio access node.

An example of a further embodiment of the instant invention, which can be referred to as item 6, is the apparatus of item 1, wherein the sending of the retrieved information allows a UE to continue a normal RRC Connection Resume procedure.

An example of a further embodiment of the instant invention, which can be referred to as item 7, is the apparatus of item 5, wherein the sending a Fetch UE context request is triggered by receiving, by the second radio access node, downlink data from core network.

An example of a further embodiment of the instant invention, which can be referred to as item 8, is the apparatus of item 1, wherein the sending of the Fetch UE context request is triggered by receiving an RRC Connection Resume Request from a UE.

An example of a further embodiment of the instant invention, which can be referred to as item 9, is the apparatus of item 1, wherein sending ACK means success of the push UE context notification and sending the NACK means failure of the Push UE context notification.

An example of a further embodiment of the instant invention, which can be referred to as item 10, is the apparatus of item 1, wherein the at least one memory and the computer code are configured, with the at least one processor, to cause the apparatus to at least further perform the following: instead of sending information, sending a stop/disallow message, wherein a stop/disallow message indicates the apparatus notifying the sender of the push UE context notification to stop sending further push UE context notifications.

An example of a further embodiment of the instant invention, which can be referred to as item 11, is the apparatus of item 1, wherein the apparatus is comprised in at least one of: a radio access node; a radio access node Intelligent Controller; a Cloud service; a separate standalone equipment; and wherein in the instance where the apparatus is comprised in a multiplicity of devices, each device in the multiplicity is in communication within a network.

An example of a further embodiment of the instant invention, which can be referred to as item 12, is the apparatus of item 11, wherein the push UE context notification comprises a same UE context sent to each device of the multiplicity or comprises different UE contexts sent to each device of the multiplicity.

An example of a further embodiment of the instant invention, which can be referred to as item 13, is the apparatus of item 12, wherein the at least one memory and the computer code are configured, with the at least one processor, to cause the apparatus to at least further perform the following: maintaining a mapping of UE context identifiers to identifiers of each device in the multiplicity to which the context has been pushed.

An example of a further embodiment of the instant invention, which can be referred to as item 14, is the apparatus of item 1, wherein the Push UE context request and the Fetch UE context request comprise a same UE identity.

An example of a further embodiment of the instant invention, which can be referred to as item 15, is the apparatus of item 1, wherein the at least one memory and the computer code are configured, with the at least one processor, to cause the apparatus to at least further perform the following: providing a resume identity to the UE, wherein the resume identity embeds either the identity of the radio access node node that pushed the UE context, or the identity of the apparatus from where the context can be fetched.

An example of an additional embodiment of the instant invention, which can be referred to as item 16, is a method comprising: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

An example of a further additional embodiment of the instant invention, which can be referred to as item 17, is the method of item 16, wherein the information of the Push UE context notification comprises contexts and corresponding identifiers of one or more UEs entering RRC inactive state.

An example of a further additional embodiment of the instant invention, which can be referred to as item 18, is the method of item 16, wherein information provided in the Fetch UE Context Request comprises an identifier of a UE in RRC inactive state.

An example of a further additional embodiment of the instant invention, which can be referred to as item 19, is the method of item 18, wherein information requested by the Fetch UE Context Request comprises a UE context corresponding to the identifier.

An example of a further additional embodiment of the instant invention, which can be referred to as item 20, is the method of item 16, wherein the Push UE context notification is received by the RICH entity from a first radio access node and the Fetch UE context request is received by the RICH entity from a second radio access node.

An example of a further additional embodiment of the instant invention, which can be referred to as item 21, is the method of item 16, wherein the sending of the retrieved information allows a UE to continue a normal RRC Connection Resume procedure.

An example of a further additional embodiment of the instant invention, which can be referred to as item 22, is the method of item 20, wherein the sending a Fetch UE context request is triggered by receiving, by the second radio access node, downlink data from core network.

An example of a further additional embodiment of the instant invention, which can be referred to as item 23, is the method of item 16, wherein the sending of the Fetch UE context request is triggered by receiving an RRC Connection Resume Request from a UE.

An example of a further additional embodiment of the instant invention, which can be referred to as item 24, is the method of item 16, wherein sending ACK means success of the push UE context notification and sending the NACK means failure of the Push UE context notification.

An example of a further additional embodiment of the instant invention, which can be referred to as item 25, is the method of item 16, further comprising: instead of sending information, sending a stop/disallow message, wherein a stop/disallow message indicates the apparatus notifying the sender of the push UE context notification to stop sending further push UE context notifications.

An example of a further additional embodiment of the instant invention, which can be referred to as item 26, is the method of item 16, wherein the RICH entity is comprised in at least one of: a radio access node; a radio access node Intelligent Controller; a Cloud service; a separate standalone equipment; and wherein in the instance where the RICH entity is comprised in a multiplicity of devices, each device in the multiplicity is in communication within a network.

An example of a further additional embodiment of the instant invention, which can be referred to as item 27, is the method of item 26, wherein the push UE context notification comprises a same UE context sent to each RICH entity of the multiplicity or comprises different UE contexts sent to each RICH entity of the multiplicity.

An example of a further additional embodiment of the instant invention, which can be referred to as item 28, is the method of item 27, further comprising: maintaining a mapping of UE context identifiers to identifiers of each device in the multiplicity to which the context has been pushed.

An example of a further additional embodiment of the instant invention, which can be referred to as item 29, is the method of item 16, wherein the Push UE context request and the Fetch UE context request comprise a same UE identity.

An example of a further additional embodiment of the instant invention, which can be referred to as item 30, is the method of item 16, further comprising providing a resume identity to the UE, wherein the resume identity embeds either the identity of the radio access node node that pushed the UE context, or the identity of the RICH entity from where the context can be fetched.

An example of an additional embodiment of the instant invention, which can be referred to as item 31, is a computer program that comprises code for: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

An example of an additional embodiment of the instant invention, which can be referred to as item 32, is the computer program according to item 31, wherein the computer program is embodied on a computer program product comprising a computer-readable medium bearing computer program code therein for use with a computer.

An example of yet another embodiment of the current invention, which can be referred to as item 33, is a non-transitory computer-readable medium encoded with instructions that, when executed by a computer, performs the method of any of items 15-30.

An example of yet another embodiment of the current invention, which can be referred to as item 34, is a computer program product embodied on a non-transitory computer-readable medium in which a computer program is stored that, when being executed by a computer, is configured to provide instructions to control or carry out at least: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

An example of a still further embodiment of the present invention, which can be referred to as item 35, is an apparatus, comprising means for: receiving, by a RICH entity from a radio access node, a Push UE context notification or a Fetch UE Context Request; in response to the receiving of the Push UE context notification, sending the radio access node an ACK or NACK; in response to the receiving of the Fetch UE Context Request, retrieving information requested; and in response to the sending of the ACK, storing information contained in the notification; in response to the retrieving, sending the radio access node the retrieved information.

Although various aspects of the invention are set out in the independent claims, other aspects of the invention comprise other combinations of features from the described embodiments and/or the dependent Claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is the added functionality.

It is also noted herein that while the above describes example embodiments of the invention, these descriptions should not be viewed in a limiting sense. Rather, there are several variations and modifications which may be made without departing from the scope of the present invention.

What is claimed is:

1. An apparatus comprising:
   at least one processor; and
   at least one memory storing instructions that, when executed by the at least one processor, cause the apparatus to at least perform:
   receiving, with a radio resource control inactive context hosting entity implemented by the apparatus from a radio access node, a push user equipment context notification for a user equipment in a radio resource control inactive state or a fetch user equipment context request for the user equipment in the radio resource control inactive state, wherein the radio resource control inactive context hosting entity stores contexts and corresponding identifiers of one or more user equipment that are in the radio resource control inactive state;
   in response to:
      the receiving of the push user equipment context notification, sending to the radio access node an acknowledgment or a negative-acknowledgment; or
      the receiving of the fetch user equipment context request, retrieving information requested; and
   in response to:
      the sending of the acknowledgment, storing information contained in the notification; or
      the retrieving, sending to the radio access node the retrieved information; and
      in response to the acknowledgement, receiving a message providing a radio resource control connection suspend and a resume identity radio network temporary identifier,
      wherein the message comprises at least one of an identity of the radio access node or an identity of the push user equipment for a transition back from a radio resource control inactive to a radio resource control connected state.

2. The apparatus of claim 1, wherein the information of the push user equipment context notification comprises contexts and corresponding identifiers of one or more user equipment entering radio resource control inactive state, and the storing the information contained in the notification comprises storing the contexts and corresponding identifiers of the one or more user equipment entering radio resource control inactive state.

3. The apparatus of claim 1, wherein information provided in the fetch user equipment context request comprises an identifier of a user equipment in the radio resource control inactive state, and the retrieving the information requested uses at least the identifier of the user equipment.

4. The apparatus of claim 3, wherein information requested with the fetch user equipment context request comprises a user equipment context corresponding to the identifier, and the retrieving information requested comprises retrieving the user equipment context corresponding to the identifier.

5. The apparatus of claim 1, wherein the push user equipment context notification is received with the apparatus from a first radio access node and the fetch user equipment context request is received with the apparatus from a second radio access node.

6. The apparatus of claim 5, wherein the sending a fetch user equipment context request is triggered with receiving, with the second radio access node, downlink data from a core network.

7. The apparatus of claim 1, wherein the sending of the retrieved information allows a user equipment to continue a radio resource control connection resume procedure.

8. The apparatus of claim 1, wherein the sending of the fetch user equipment context request is triggered with receiving a radio resource control connection resume request from a user equipment.

9. The apparatus of claim 1, wherein sending acknowledgment signals success of the push user equipment context notification and sending the negative-acknowledgment signals failure of the push user equipment context notification.

10. The apparatus of claim 1, wherein the at least one memory stores instructions that, when executed by the at least one processor, cause the apparatus to at least further perform:
    sending a at least one of a stop or disallow message, wherein the at least one of a stop or disallow message indicates the apparatus is notifying a sender of the push user equipment context notification to stop sending further push user equipment context notifications due to the radio resource control inactive context hosting entity no longer being able to store further user equipment contexts.

11. The apparatus of claim 1, wherein the apparatus is comprised in at least one of:
    a radio access node;
    a radio access node intelligent controller;
    a cloud service;
    a separate standalone equipment; or
    wherein in an instance where the apparatus is comprised in a multiplicity of devices, each device in the multiplicity is in communication within a network.

12. The apparatus of claim 11, wherein the push user equipment context notification comprises a same user equipment context sent to each device of the multiplicity or comprises different user equipment contexts sent to each device of the multiplicity.

13. The apparatus of claim 12, wherein the at least one memory stores instructions that, when executed by the at least one processor, cause the apparatus to at least further perform:
    maintaining a mapping of user equipment context identifiers to identifiers of each device in the multiplicity to which the user equipment context has been pushed.

14. The apparatus of claim 1, wherein the push user equipment context notification and the fetch user equipment context request comprise a same user equipment identity.

15. The apparatus of claim 1, wherein the at least one memory stores instructions that, when executed by the at least one processor, cause the apparatus to at least further perform:

providing a resume identity to the user equipment, wherein the resume identity embeds either an identity of a radio access node that pushed user equipment context, or an identity of the apparatus from where the user equipment context can be fetched.

16. A method comprising:

receiving, with a radio resource control inactive context hosting entity from a radio access node, a push user equipment context notification for a user equipment in a radio resource control inactive state or a fetch user equipment context request for the user equipment in the radio resource control inactive state, wherein the radio resource control inactive context hosting entity stores contexts and corresponding identifiers of one or more user equipment that are in a radio resource control inactive state;

in response to:
        the receiving of the push user equipment context notification, sending to the radio access node an acknowledgment or a negative-acknowledgment; or
        the receiving of the fetch user equipment context request, retrieving information requested; and     in response to:
        the sending of the acknowledgment, storing information contained in the notification; or
        the retrieving, sending to the radio access node the retrieved information; and
        in response to the acknowledgement, receiving a message providing a radio resource control connection suspend and a resume identity radio network temporary identifier,
        wherein the message comprises at least one of an identity of the radio access node or an identity of the push user equipment for a transition back from a radio resource control inactive to a radio resource control connected state.

17. The method of claim 16, wherein the information of the push user equipment context notification comprises contexts and corresponding identifiers of one or more user equipment entering radio resource control inactive state, and the storing the information contained in the notification comprises storing the contexts and corresponding identifiers of the one or more user equipment entering radio resource control inactive state.

18. The method of claim 16, wherein information provided in the fetch user equipment context request comprises an identifier of a user equipment in radio resource control inactive state, and the retrieving the information requested uses at least the identifier of the user equipment.

19. The method of claim 18, wherein information requested with the fetch user equipment context request comprises a user equipment context corresponding to the identifier, and the retrieving information requested comprises retrieving the user equipment context corresponding to the identifier.

20. A computer program product embodied on a non-transitory computer-readable medium in which a computer program is stored that, when being executed by an apparatus, causes the apparatus to perform at least:

receiving, with a radio resource control inactive context hosting entity from a radio access node, a push user equipment context notification for a user equipment in a radio resource control inactive state or a fetch user equipment context request for the user equipment in the radio resource control inactive state, wherein the radio resource control inactive context hosting entity stores contexts and corresponding identifiers of one or more user equipment that are in a radio resource control inactive state;

in response to:
        the receiving of the push user equipment context notification, sending to the radio access node an acknowledgment or a negative-acknowledgment; or
        the receiving of the fetch user equipment context request, retrieving information requested; and     in response to:
        the sending of the acknowledgment, storing information contained in the notification; or
        the retrieving, sending to the radio access node the retrieved information; and
        in response to the acknowledgement, sending a message providing a radio resource control connection suspend and a resume identity radio network temporary identifier,
        wherein the message comprises at least one of an identity of the radio access node or an identity of the push user equipment for a transition back from a radio resource control inactive to a radio resource control connected state.

\* \* \* \* \*